I. GREGORY.
HORTICULTURAL IMPLEMENT.
APPLICATION FILED FEB. 13, 1911.
1,011,947.
Patented Dec. 19, 1911.
2 SHEETS—SHEET 1.
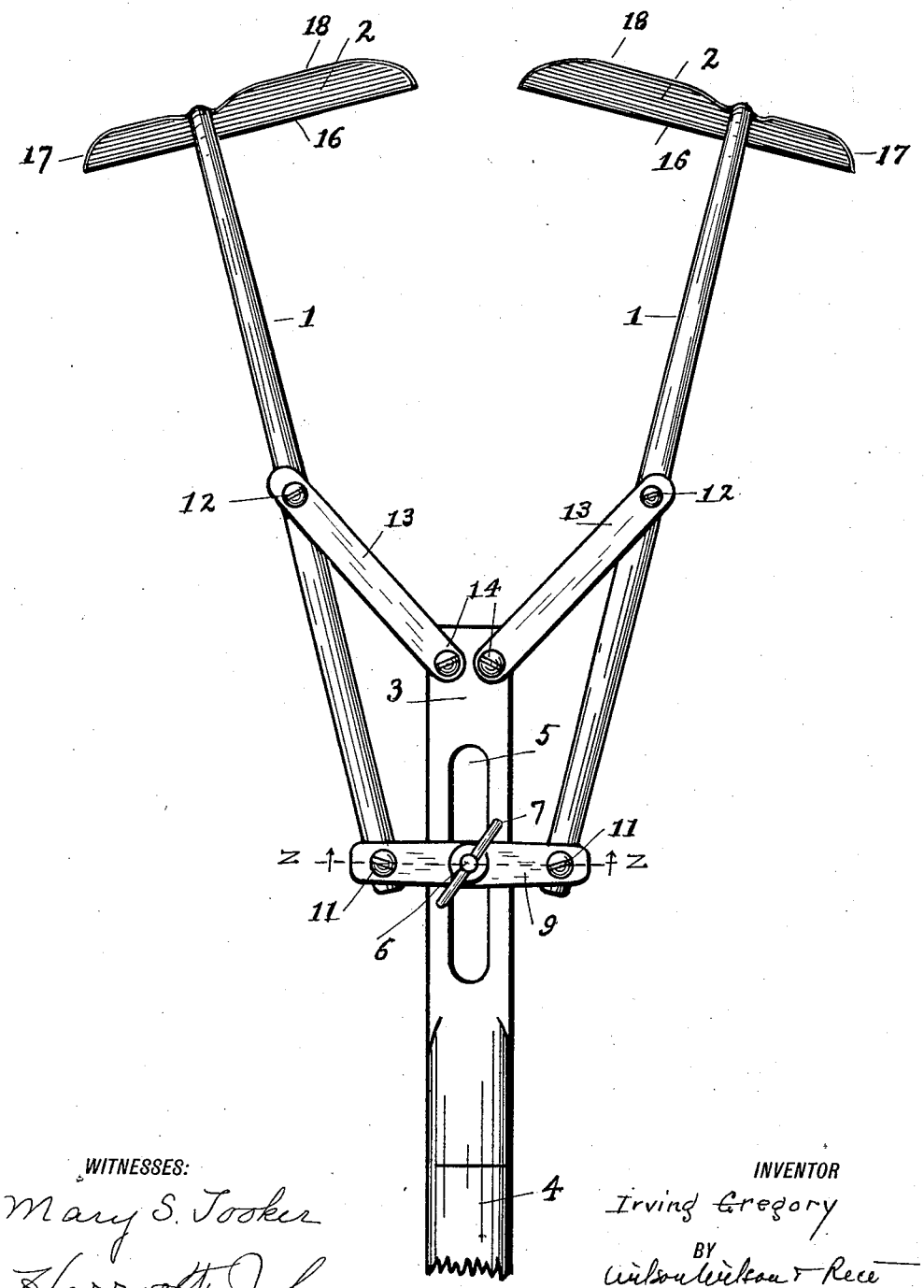

I. GREGORY.
HORTICULTURAL IMPLEMENT.
APPLICATION FILED FEB. 13, 1911.
1,011,947.
Patented Dec. 19, 1911.
2 SHEETS—SHEET 2.
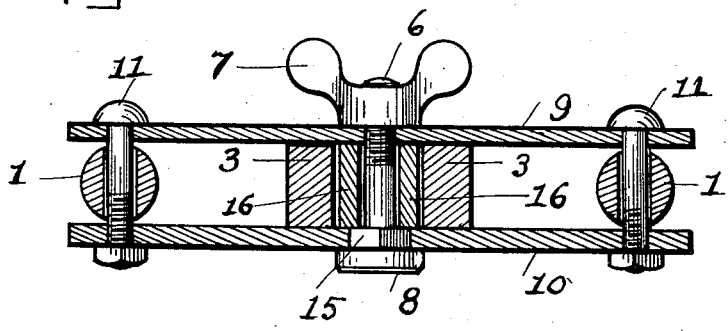
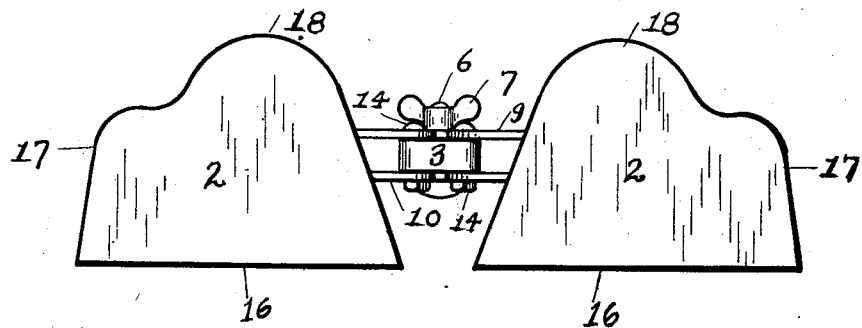
WITNESSES:
Mary S. Tooker
Harry F. Johnson
INVENTOR.
Irving Gregory
BY
Wilson Wilson & Rice
ATTORNEYS

UNITED STATES PATENT OFFICE.

IRVING GREGORY, OF SPARTA TOWNSHIP, KENT COUNTY, MICHIGAN.

HORTICULTURAL IMPLEMENT.

1,012,147. Specification of Letters Patent. Patented Dec. 19, 1911.

Application filed February 13, 1911. Serial No. 608,357.

*To whom it may concern:*

Be it known that I, IRVING GREGORY, a citizen of the United States, residing at the township of Sparta, in the county of Kent and State of Michigan, have invented new and useful Improvements in Horticultural Implements, of which the following is a specification.

My present invention relates to horticultural implements, and its object is to produce an implement variously improved and capable of certain adjustments and actions. This object is attained by, and the invention finds a preferable embodiment in, the implement hereinafter described, and illustrated by the accompanying drawings, in which:

Figure 1 is a top plan view of my horticultural implement; Fig. 2 is an enlarged sectional view of parts of the same sectioned on line Z—Z of Fig. 1; and Fig. 3 is an end view of the implement.

Shank portions 1 of a pair of garden tools, as the hoes 2, are pivotally connected (one on either side) to the body portion or head 3, which is provided with a handle portion, shown partly broken away at 4. The body portion 3 has a longitudinal slot 5 therethrough, in which is adapted to travel a binding screw bolt 6 having a finger nut 7, and opposite bolt head is a cross-bar, comprising two parallel and coöperating members 9 and 10, may be held by the finger nut in a desired position on the body portion; that is, the cross-bar may be moved toward or from the extremity of the body portion within the limits of the slot, and may also be turned on the bolt as an axis, and in any such position may be clamped by the finger nut. The shank portions 1 at their extremities are pivoted at 11 to this cross-bar, and near their centers are pivoted at 12 to the links 13, which links are pivoted at 14 to the body portion 3 near its extremity. The distance on the link from the link's pivot 12 on the shank portion 1 to the projected longitudinal center line of the slot is not the same as the distance on the cross-bar from the shank's pivot 11 on said shank portion to said center line (but is greater in the construction shown), so that, as the cross-bar is moved longitudinally the body 3, the hoes are brought nearer together or farther apart. In this way the hoes may be adjusted so that the implement may be used to cultivate both sides of a row of plants simultaneously: and in order that the operator may stand on one side the row and readily so use this implement, the cross-bar may be turned to an acute angle with said center line of the slot, which action will incline one hoe farther from the side of the handle than the other. A portion 15 of the screw-bolt's shank is squared in the member 10 to prevent turning, and a loose sleeve 16 within the slot and surrounding the screw-bolt may be provided as shown.

It will be seen that not only the ordinary cutting edges 16 of the hoes may be utilized in cultivation, but also the sides 17 of each, which form with the edges 16 an acute angle; and in addition the rounded top portions 18 afford a desirable shape for the cultivating edge of such an implement.

It will be understood that other cultivating tools, as rakes, etc., may be used in my implement, instead of the hoes shown.

Not confining myself to the details of construction shown and described, I claim:

1. In an implement of the character described, a pair of cultivating tools provided with shank portions, a body portion having a handle, a cross-bar pivoted to the shank portions and adapted to be moved longitudinally of the body portion and to be turned to a position inclined thereto, a clamp to secure the cross-bar in a desired position on the body portion, and links pivoted to the body portion and to the shank portions respectively, the distance on the cross-bar between the pivotal connection of the cross-bar with the shank portion and the line of the cross-bar's movement on the body portion being different from the distance on the link between the pivotal connection of the link with said shank and said line.

2. In an implement of the character described, a handle portion, and a pair of hoe blades held on the handle portion in adjustable relation to each other, said hoes having a cultivating edge 16 on one side, on the opposite side a combined double curved cultivating edge 18, and on the two other sides opposite each other, cultivating edges 17 forming respectively an acute angle with the edge 16.

3. In an implement of the character described, a pair of cultivating tools provided with shank portions, a body portion having a longitudinal slot therethrough and a handle, a cross-bar pivoted to the shank portions and pivotally connected to the body portion by a screw bolt adapted to travel in the slot, a nut on the screw-bolt adapted to clamp the cross-bar in an adjusted position on the body portion, and links pivoted to the body portion and to the shank portions respectively, the distance on the cross-bar between the pivotal connection of the cross-bar with the shank portion and the longitudinal center line of the slot being different from the distance on the link between the pivotal connection of the link with said shank and said line.

In testimony whereof I have hereunto set my hand in presence of two subscribing witnesses.

IRVING GREGORY.

Witnesses:
HARRY F. JOHNSON,
MARY SCHULTE.

Copies of this patent may be obtained for five cents each, by addressing the "Commissioner of Patents, Washington, D. C."